United States Patent
Paulsen et al.

(10) Patent No.: US 9,507,979 B2
(45) Date of Patent: Nov. 29, 2016

(54) SAVING POWER IN A BATTERY POWERED SYSTEM HAVING A TOUCH SENSOR AND AN RFID TAG READER

(71) Applicant: CIRQUE CORPORATION, Salt Lake City, UT (US)

(72) Inventors: Keith L. Paulsen, Centerville, UT (US); Andrew Paulsen, Salt Lake City, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 294 days.

(21) Appl. No.: 13/869,729

(22) Filed: Apr. 24, 2013

(65) Prior Publication Data

US 2013/0285797 A1    Oct. 31, 2013

Related U.S. Application Data

(60) Provisional application No. 61/639,649, filed on Apr. 27, 2012.

(51) Int. Cl.
   *G06K 7/10*      (2006.01)

(52) U.S. Cl.
   CPC ....... *G06K 7/10207* (2013.01); *G06K 7/10128* (2013.01)

(58) Field of Classification Search
   CPC .................. G06K 7/10207; G06K 7/10128

USPC .......................................... 340/10.5; 345/173
See application file for complete search history.

(56) References Cited

U.S. PATENT DOCUMENTS

| | | | | |
|---|---|---|---|---|
| 6,085,071 A | * | 7/2000 | Yamada et al. | 455/82 |
| 2009/0167699 A1 | * | 7/2009 | Rosenblatt et al. | 345/173 |
| 2010/0297952 A1 | * | 11/2010 | Rofougaran | 455/73 |
| 2013/0162594 A1 | * | 6/2013 | Paulsen et al. | 345/174 |
| 2013/0176252 A1 | * | 7/2013 | Frojdh | 345/173 |

FOREIGN PATENT DOCUMENTS

CN        102034064 A      4/2011

\* cited by examiner

*Primary Examiner* — Edwin Holloway, III
(74) *Attorney, Agent, or Firm* — Morriss O'Bryant Compagni, PC

(57) ABSTRACT

A system and method that combines RFID tag reader circuitry and a touch sensor, wherein the system and method may reduce power consumption of a battery powered system by detecting the presence of an RFID tag by using a lower power consumption touch sensor instead of scanning for the RFID tag by using higher power RFID tag detection and reading circuitry, controlling activation and deactivation of the RFID tag detection and reading circuitry when the touch sensor has detected the presence of the RFID tag, and reconfiguring sensor electrodes so that the electrodes may form a touch sensor or an antenna as needed.

20 Claims, 8 Drawing Sheets

SAVING POWER IN A BATTERY POWERED SYSTEM HAVING A TOUCH SENSOR AND AN RFID TAG READER

BACKGROUND OF THE INVENTION

Field Of the Invention

This invention relates generally to touch sensors including touchpads and touchscreens. More specifically, the present invention is a method of conserving power in a system that combines a touch sensor with RFID sensing circuitry.

Description of Related Art

There are several designs for capacitance sensitive touch sensors. It is useful to examine the underlying technology to better understand how any capacitance sensitive touch sensor can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing.

The present invention combines touch sensor and radio frequency identification (RFID) technology. Current near-field communication (NFC)/RFID systems consume considerable amounts of power when determining if an RFID card or tag is present when an RFID sensor is activated. The prior art may use a method such as periodic polling to help reduce the amount of power being consumed when determining if an RFID card or tag is present, but this method suffers from greater latency and still requires a considerable amount of current to stimulate the tag sufficiently to be powered long enough to get a response. Accordingly, it would be an advantage over the prior art to provide a combined touch sensor/RFID system that may reduce power consumption by the RFID circuitry, and therefore save power for the combined system.

BRIEF SUMMARY OF THE INVENTION

In a preferred embodiment, the present invention is a system and method that combines RFID tag reader circuitry and a touch sensor, wherein the system and method may reduce power consumption of a battery powered system by detecting the presence of an RFID tag by using a lower power consumption touch sensor instead of scanning for the RFID tag by using higher power RFID tag detection and reading circuitry, controlling activation and deactivation of the RFID tag detection and reading circuitry when the touch sensor has detected the presence of the RFID tag, and reconfiguring sensor electrodes so that the electrodes may form a touch sensor or an antenna as needed.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It should be understood that use of the term "touch sensors" throughout this document includes any capacitive touch sensor device, including touchpads, touch screens and touch panels and includes proximity and touch sensing capabilities.

The first embodiment of the present invention is a method of using a touch sensor and a contactless card or tag reader, also referred to in this document as RFID tag detection and reading circuitry. A contactless reader is defined as using radio frequency identification (RFID) or near filed communication (NFC) technology to wirelessly read data. RFID is the wireless non-contact use of radio-frequency electromagnetic fields to transfer data, for the purposes of automatically identifying and tracking tags typically attached to objects. A card or tag may be used interchangeably throughout this document. The present invention is therefore using RFID technology or touch sensor technology to read an RFID tag. The RFID tag reader may include an RFID antenna and RFID tag detection and reading circuitry.

The first embodiment is directed to a method of use. The prior art teaches that a touch sensor is used to detect the presence of objects in order to provide input on a device such as a touchpad or touchscreen. The prior art also teaches that an RFID tag reader is directed to the function of reading data from a contactless tag. The first embodiment combines these functions in order to reduce power consumption of a device that includes a touch sensor and an RFID tag reader.

Figure 2:
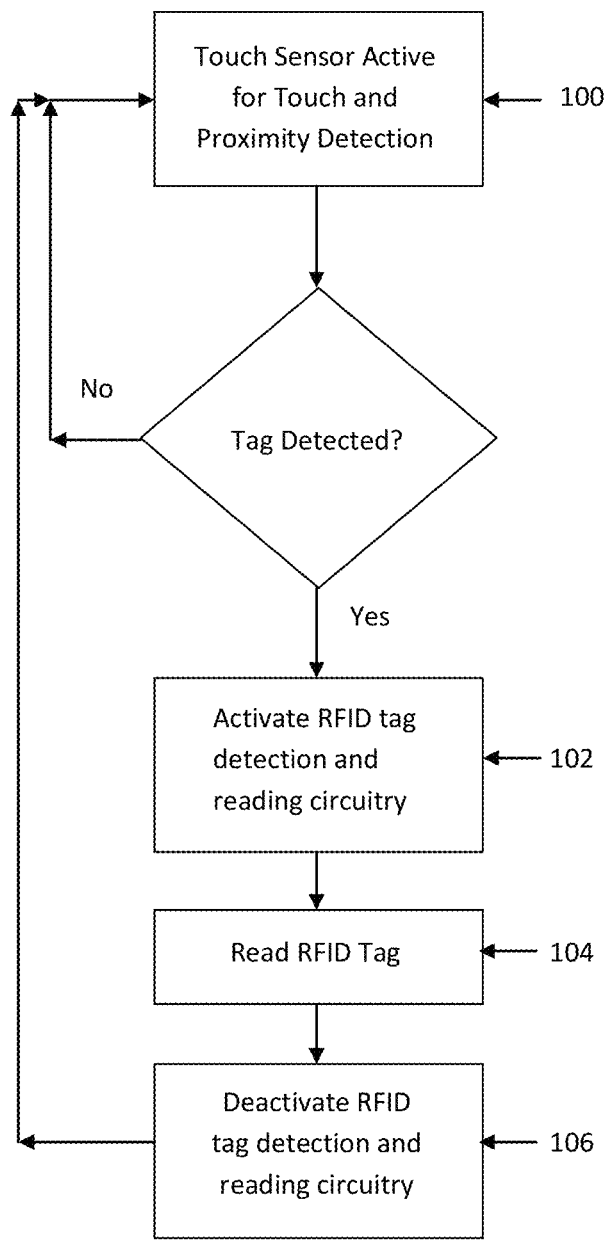
FIG. 2 is a flowchart showing a method of sharing functions of a device in order to reduce power consumption.

FIG. 2 is a flowchart showing a method of sharing functions in order to reduce power consumption. In a first step 100, the touch sensor may be used for both proximity and touch detection. Touch detection is active in case a finger or other pointing object makes contact with the touch sensor. Proximity detection is active and may be used for detection of a contactless tag. Because the touch sensor is performing touch and proximity detection functions, the contactless tag circuitry does not have to be on or activated in order to perform periodic polling to try and detect the presence of a tag.

It should be understood that the functions performed by the touch sensor when touch is detected are not a part of the present invention and are well known to those skilled in the art.

The touch sensor uses touch sensor circuitry that may use less power than RFID tag detection and reading circuitry. Thus, the touch sensor may continuously operate in a detection mode and it will draw less power than the RFID tag detection and reading circuitry operating in a periodic polling mode wherein it takes periodic measurements to detect a contactless tag. Thus, the touch sensor may be operating in a touch and proximity sensing mode wherein detection of a contactless tag may take place at some distance from the touch sensor. This distance may be a matter of inches as is common for the detection of a contactless tag, further away, or closer.

The touch sensor is not being used to read data from the RFID tag, but only to detect its presence. Once the RFID tag is detected by the touch sensor, the next step 102 may be to activate the RFID tag detection and reading circuitry which consumes more power. It may or may not be the case that the touch sensor and the RFID tag detection and reading circuitry may interfere with each other. If interference is possible, it may be desirable to deactivate the touch sensor while the RFID tag detection and reading circuitry is active and reading data. Thus, a processor in communication with the touch sensor and the RFID tag detection and reading circuitry may deactivate the touch sensor while data is read, and then reactivate the touch sensor after data is read. Any type of processor, in hardware or software, may be used to control deactivation and reactivation of the RFID tag detection and reading circuitry.

The next step 104 may then be to read the data from the contactless tag. Once the data has been read, the next step 106 may be to deactivate the RFID tag detection and reading circuitry in order to save power. After this final step is completed, the algorithm returns to the first step 104 where the touch sensor is operating in a touch and proximity sensing mode to detect the presence of a pointing object or of the contactless tag.

When the contactless tag is detected, it may or may not be necessary to deactivate the touch sensor while the RFID tag detection and reading circuitry is reading the data. If operation of the touch sensor will interfere with the RFID tag detection and reading circuitry, then the touch sensor is deactivated until data from the tag has been read and the RFID tag detection and reading circuitry can be deactivated.

In a second embodiment, the present invention may enable the touch sensor circuitry and the RFID tag detection and reading circuitry to share touch sensor components such as the touch sensor (the electrode grid that forms the touch sensor). In the second embodiment, the touch sensor circuitry and the RFID tag detection and reading circuitry may operate as shown in FIG. 3.

Figure 3:
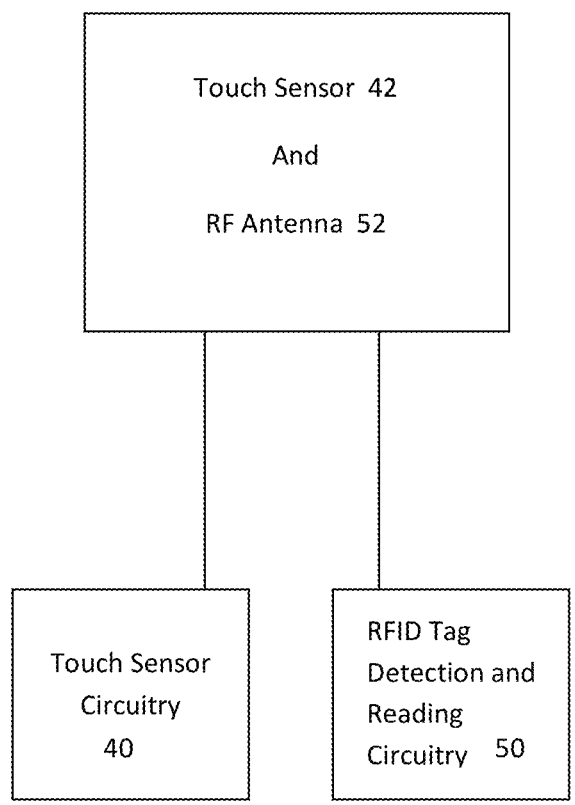
FIG. 3 is a block diagram that shows that touch sensor circuitry 40 and the RFID tag detection and reading circuitry 50 may share some of the same electrodes.

FIG. 3 is a block diagram that shows that touch sensor circuitry 40 and the RFID tag detection and reading circuitry 50 may share some of the same electrodes that form a touch sensor 42 and an RF or near-field communication (NFC) antenna 52 (referred to as an RF antenna hereinafter).

Figure 4:
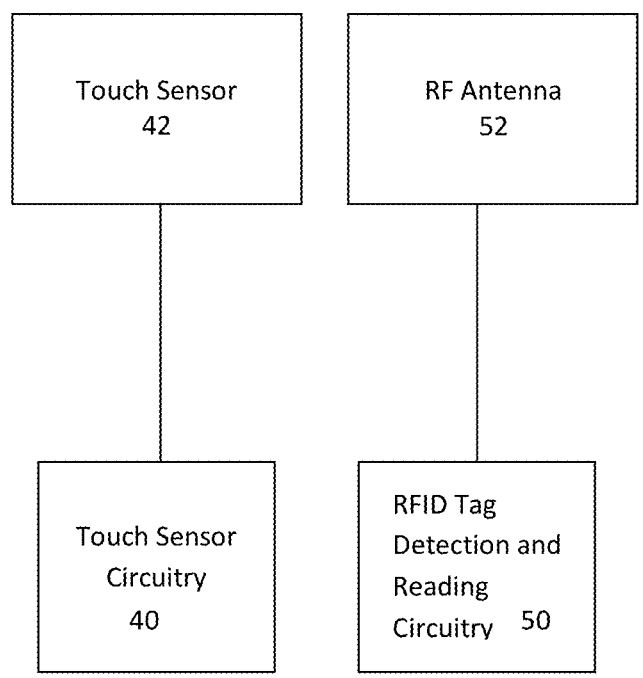
FIG. 4 is a block diagram wherein the touch sensor circuitry and the RFID tag detection and reading circuitry may not share the same electrodes.

In a third embodiment shown in FIG. 4, the touch sensor circuitry 40 and the RFID tag detection and reading circuitry 50 may not share the same electrodes to form the touch sensor 42 and the RF antenna 52. The touch sensor 42 and the RF antenna 52 may be disposed near enough to each other so that when the touch sensor circuitry 40 has detected the contactless tag using the touch sensor 42, the RF antenna 52 will be close enough to the contactless tag to read the data. Nevertheless, the benefits of the present invention may still be achieved if the touch sensor circuitry 40 is being used to detect the RFID tag before the RFID tag detection and reading circuitry is activated in order to read the data.

Returning to FIG. 3 wherein the touch sensor 42 and an RF antenna 52 may share some of the same electrodes, the following information is provided for construction of such a device.

Figure 1:
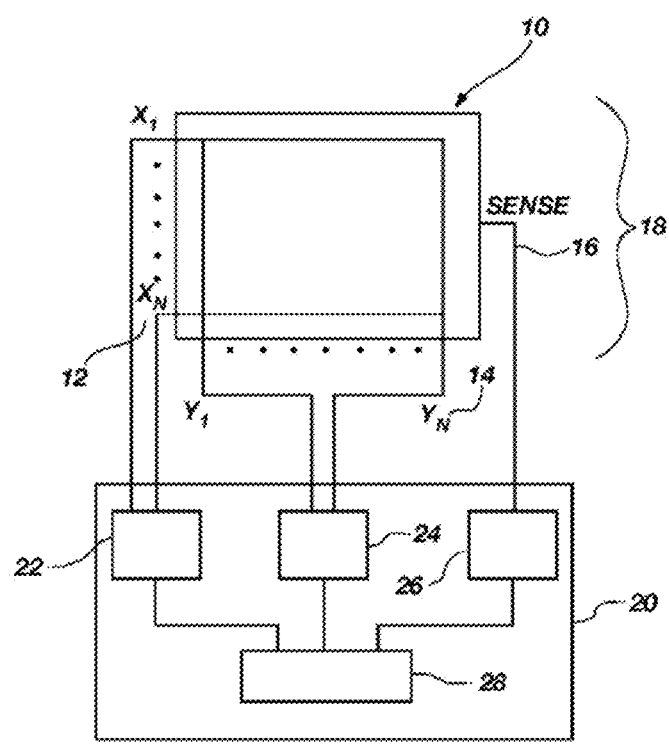
FIG. 1 is a block diagram of the components of a capacitance-sensitive touchpad as made by CIRQUE® Corporation and which can be operated in accordance with the principles of the present invention.
Figure 5:
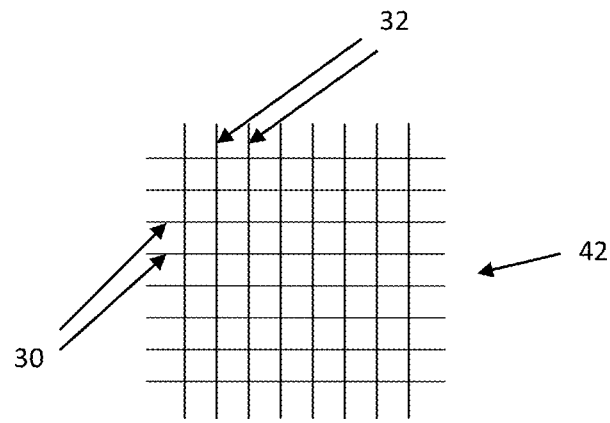
FIG. 5 is a dynamically reconfigurable electrode grid that may form the touch sensor and an RF antenna.

The second embodiment of the invention may be a touch sensor 42 (an electrode grid) such as the GLIDEPOINT® contactless touchpad shown in FIG. 1 and sold by CIRQUE® Corporation. The second embodiment of the present invention may be a dynamically reconfigurable electrode grid as shown in FIG. 5. The dynamically configurable electrode grid may function as a touch sensor 42 when it is configured such that there are a plurality of parallel horizontal electrodes 30 and a plurality of parallel vertical electrodes 32 as shown in FIG. 5. The plurality of horizontal electrodes 30 are in a same plane but may be substantially orthogonal to the plurality of vertical electrodes 32 as described above in the prior art. The plurality of horizontal electrodes 30 are separated from the plurality of vertical electrodes 32 by any means known to those skilled in the art. For example, the electrodes 30, 32 may be on opposite sides of a substrate, or may be on a same side of a substrate, but separated by a dielectric layer of material.

It is noted that the number and the length of the horizontal and vertical electrodes 30, 32 are for illustration purposes only, and that the actual number and the length of the electrodes may vary. There are a total of eight horizontal and vertical electrodes 30, 32 being shown for illustration purposes.

The electrodes that form the horizontal and vertical electrodes 30, 32 of the touch sensor 42 may not be continuous traces but may instead be formed as a plurality of conductive segments that may be coupled in the desired layout to form the electrodes 30, 32.

Figure 6:
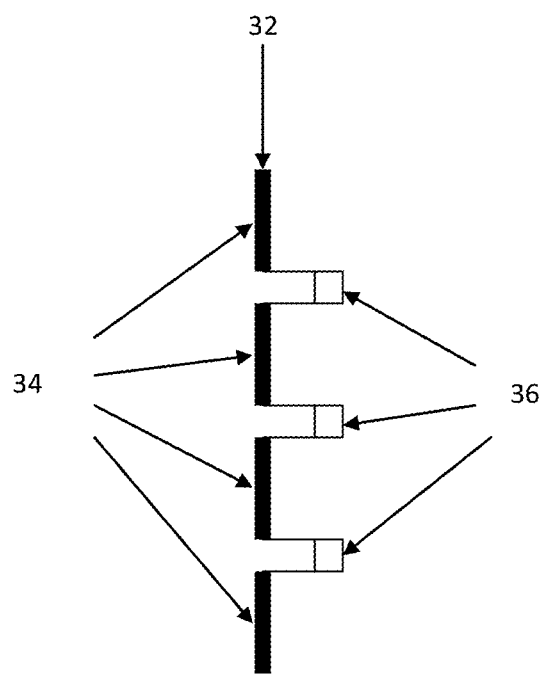
FIG. 6 is a close-up top view, for example, of a portion of a single vertical electrode that may be formed from a plurality of vertical conductive segments.

FIG. 6 is a close-up top view, for example, of a portion of a single vertical electrode 32 that may be formed from a plurality of vertical conductive segments 34. The plurality of conductive segments 34 may be controlled by a switch on one or more of the plurality of conductive segments. For example, a transistor 36 may control a connection to each of the plurality of conductive segments 34. By applying a signal to the transistor 36, a conductive segment 34 may allow a signal to flow from one of the plurality of conductive segments 34 to another. This example of a transistor 36 to control signal flow along a horizontal electrode 30 should not be considered as limiting for any other methods that are known to those skilled in the art.

It is noted that the distance between the segments 34 is being exaggerated for illustration purposes only.

What is important to learn from FIG. 6 is that the conductivity of the plurality of horizontal 30 and vertical electrodes 32 may be controlled. This is important not only to enable the plurality of horizontal 30 and vertical electrodes 32 to carry a desired signal, but because it enables the electrodes to form different structures because portions of horizontal and vertical structures can be manipulated to create different and useful structures as will be explained.

When the electrode grid needs to function as the touch sensor 42, then the plurality of horizontal 30 and vertical electrodes 32 need to be configured such that the electrode grid structure of FIG. 5 is formed. Therefore, any switches such as transistors 36 would need to be actuated in order to create the desired electrode grid.

Figure 7:
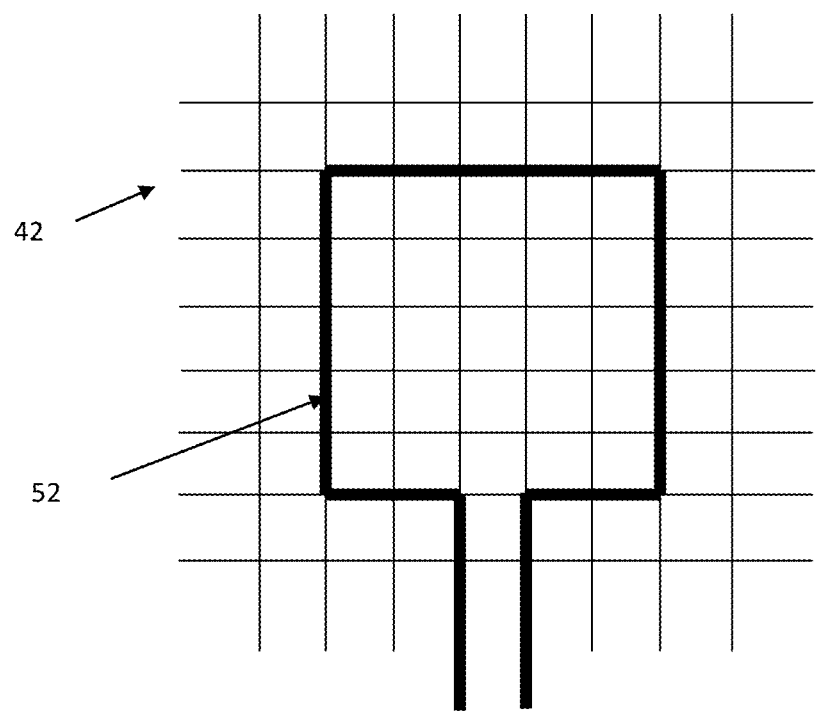
FIG. 7 shows how certain conductive segments of both the horizontal and the vertical electrodes are selected and electrically coupled using the transistors.

However, when the electrode grid needs to function as an RF antenna 52, the transistors 36 that need to be activated may be changed in order to obtain the desired electrode grid structure. For example, FIG. 7 shows how certain conductive segments 34 of both the horizontal electrodes 30 and the vertical electrodes 32 are selected and electrically coupled using the transistors 36 in order to create the shape of an antenna that is needed for operation of the RFID tag detection and reading circuitry 50. The RF antenna 52 is shown as a series of bolder lines on top of the horizontal electrodes 30 and the vertical electrodes 32. When a connection needs to be made from a horizontal electrode 30 to a vertical electrode 32, this can be accomplished using an electrode from one electrode layer to another, and again controlled by a switch such as a transistor 36.

It should be understood that the particular antenna shape shown in FIG. 7 should not be considered as limiting. A plurality of different antenna shapes or designs are possible using the process described above. The antenna shapes include multiple loops as are often used in RF and NFC applications.

In another embodiment, the touch sensor 42 and the RF antenna 52 do not share any electrodes, but only a substrate upon which they are disposed.

Figure 8:
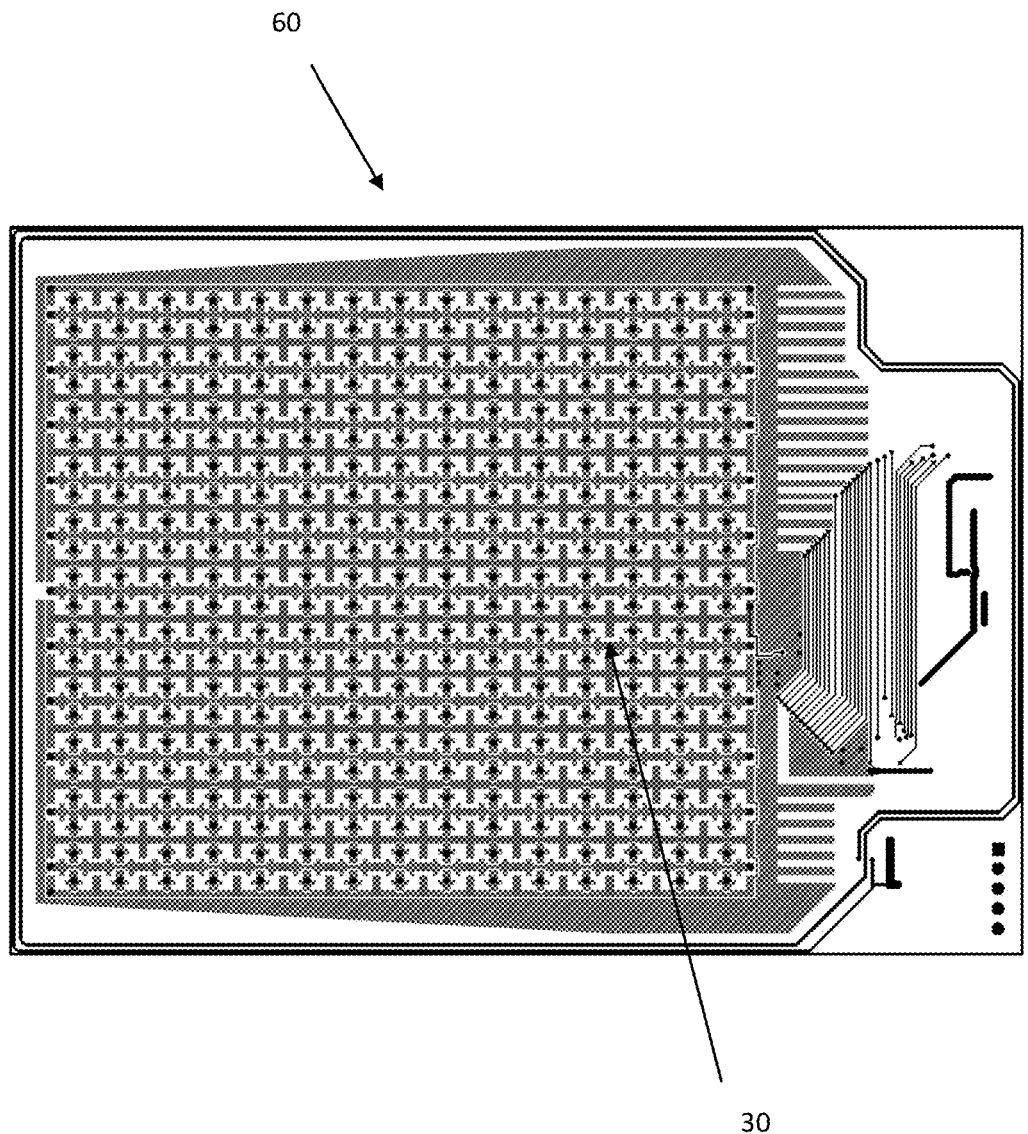
FIG. 8 is a top view of horizontal touch sensor electrodes and an RF antenna.

FIG. 8 is a top view of an example of a printed circuit board 60 that includes electrodes forming a plurality of horizontal electrodes 30 used in the touch sensor 42. These horizontal electrodes 30 may be dynamically reconfigured for use as the RF antenna 52 for the RF tag detection and reading circuitry 50.

Figure 9:
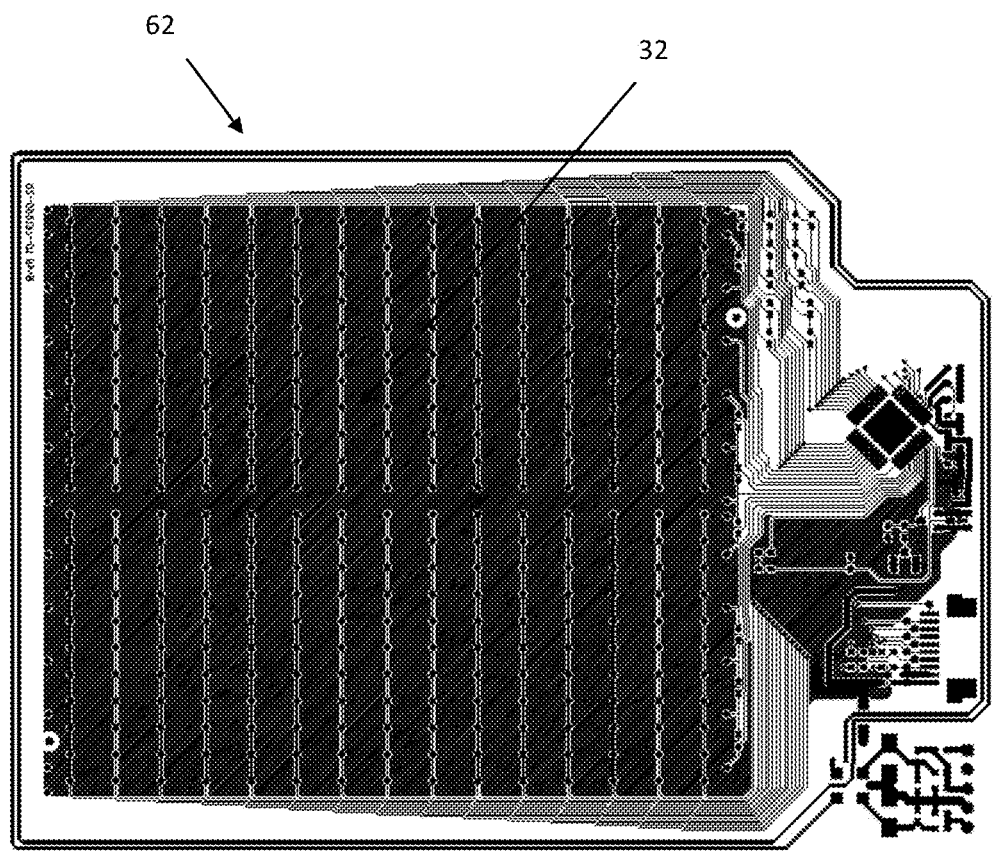
FIG. 9 is a top view of vertical touch sensor electrodes and an RF antenna.

FIG. 9 is a top view of a printed circuit board 62 that includes circuitry for a plurality of vertical electrodes 32 used in the touch sensor 42. These vertical electrodes 32 may also be dynamically reconfigured for use as the RF antenna 52 for the RF tag detection and reading circuitry 50.

In another embodiment of the present invention, different RF antennas may be constructed in order to be optimized for the reading of data from different cards or tags, or for detection of cards or tags in specific locations near the antenna.

If the touch sensor 42 and its associated touch sensor circuitry 40 and the RF antenna 52 and its associated RF tag detection and reading circuitry 50 are being used in a device being powered by a battery, considerable battery life savings may be accomplished by using capacitive proximity sensing capabilities of the touch sensor 42 to first detect the presence of an RFID tag before the RFID tag detection and reading circuitry 52 is activated in order to scan the data from the RFID tag. By keeping the RF tag detection and reading circuitry 50 deactivated as long as possible by eliminating the need to use it for detecting the RF tags, significant power savings are possible. The touch sensor, while performing its normal touch sensor operations, may also be scanning for the presence of RFID tags by also using proximity sensing capabilities. While these capabilities may be limited in accuracy and distance because of the lower power consumed by touch sensors, detection of the RFID tags is still possible. Once an RFID card or tag is detected by the touch sensor and its circuitry, the RFID tag detection and reading circuitry 52 may be activated which can then use its higher power consumption circuitry to read the RFID tag. Once the information is read, the RFID tag detection and reading circuitry 52 may be deactivated or return to a low power mode of operation where it is not actively scanning for RFID tags.

Another way to consider the present invention is that a device is operating in a low power mode until an RFID tag is detected. Once the RFID tag is detected, the device switches to a high power mode to scan the RFID tag data, and then returns to a lower power mode of operation until another RFID tag is detected.

In an alternative embodiment of the present invention, this method is modified to provide the ability to use capacitive proximity sensing to scan different areas above the touch sensor 42 in order identify a "tag area" and then it may be determined how to construct an RF antenna 52 that is optimized to scan within the tag area. It is then possible to construct the RF antenna 52 "on-the-fly" and then associate it with the tag area by repurposing electrodes of the touch sensor 42 or other structures of the touch sensor to form antenna elements of the RF antenna.

Stated more simply, instead of providing a dedicated RF antenna 52, the electrodes of the touch sensor 42 are repurposed. Individual segments 34 of electrodes 30, 32 may be dynamically configured in desired shapes or patterns by simply making connections through the use of switches that will electrically couple various electrodes together to create a continuous RF antenna design. This RF antenna 52 may use any electrodes from any of the various layers of the touch sensor 42 in order to create the desired RF antenna shape.

It should be understood that the touch sensor 42 may be a stand-alone device such as a touchpad, or be a touch screen disposed in front of an LCD display. It should also be understood that the RF tag may be embedded in a toy, a smart phone, or other object.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method of saving power in a battery powered device that includes a radio frequency identification (RFID) tag reader and a touch sensor, said method comprising:
   providing a touch sensor that can perform proximity and touch sensing;
   providing a radio frequency identification (RFID) tag reader for reading data from an RFID tag, wherein the touch sensor and the RFID tag reader are disposed in the battery powered device;
   maintaining the RFID tag reader in a deactivated state while using the touch sensor to scan for detection of the RFID tag;
   activating the RFID tag reader only after detecting the RFID tag using proximity sensing of the touch sensor;
   reading the RFID tag that was detected by the touch sensor by using the activated RFID tag reader; and
   deactivating the RFID tag reader after reading the RFID tag in order to conserve power in the battery powered device by only actively scanning for RFID tags using the touch sensor and not the RFID tag reader.

2. The method as defined in claim 1 wherein the method further comprises deactivating the touch sensor when the RFID tag reader is activated, and reactivating the touch sensor when the RFID tag reader is deactivated.

3. The method as defined in claim 1 wherein the method further comprises activating RFID tag detection and reading circuitry when activating the RFID tag reader.

4. The method as defined in claim 1 wherein the method further comprises providing an electrode grid as a sensor for the touch sensor.

5. The method as defined in claim 4 wherein the method further comprises dynamically configuring the electrode grid so that it may also function as an RFID antenna for the RFID tag reader in order to share the electrode grid.

6. The method as defined in claim 5 wherein the method further comprises forming the electrode grid from a plurality of conductive segments whose connections are controllable in order to create a desired sensor or antenna.

7. The method as defined in claim 1 wherein the method further comprises:
   1) providing an electrode grid as a sensor for the touch sensor; and
   2) providing an RFID antenna for the RFID tag reader, wherein the electrode grid and the RFID antenna are disposed adjacent to each other such that an RFID tag that is detected by the touch sensor is readable by the RFID antenna without having to move the RFID antenna.

8. A battery powered system that includes a radio frequency identification tag reader and a touch sensor, said system comprised of:
   a touch sensor that can perform proximity and touch sensing, wherein the touch sensor can use proximity sending to detect an RFID tag;
   a radio frequency identification (RFID) tag reader for reading data from the RFID tag; and
   a processor for maintaining the RFID tag reader in a deactivated state while using the touch sensor to scan for detection of the RFID tag, activating the RFID tag reader only when the touch sensor detects the RFID tag, deactivating the RFID tag reader after data has been read from the RFID tag and using the touch sensor to scan for another RFID tag, thereby conserving power of the battery powered system by not using the RFID tag reader to detect the presence of the RFID tag.

9. The system as defined in claim 8 wherein the system further comprises the processor for deactivating the touch sensor when the RFID tag reader is activated, and for activating the touch sensor when the RFID tag reader has completed reading data from the RFID tag.

10. The system as defined in claim 8 wherein the RFID tag reader is further comprised of RFID tag detection and reading circuitry and an RFID antenna.

11. The system as defined in claim 8 wherein the system further comprises an electrode grid used as a sensor for the touch sensor.

12. The system as defined in claim 11 wherein the system further comprises forming the electrode grid from a plurality of conductive segments whose connections are controllable in order to create a desired sensor or RFID antenna.

13. The system as defined in claim 8 wherein the system further comprises:
   an electrode grid as a sensor for the touch sensor; and
   an RFID antenna for the RFID tag reader, wherein the electrode grid and the RFID antenna are disposed adjacent to each other such that an RFID tag that is detected by the touch sensor is readable by the RFID antenna without having to move the RFID antenna.

14. A method of saving power in a battery powered system that includes a radio frequency identification (RFID) tag reader and a touch sensor, said method comprising:
   providing a touch sensor that can perform proximity and touch sensing;
   providing a radio frequency identification (RFID) tag reader for reading data from an RFID tag, wherein the touch sensor and the RFID tag reader are disposed in the battery powered device;

maintaining the RFID tag reader in a deactivated state while using the touch sensor to scan for detection of the RFID tag;

providing a processor for activating the RFID tag reader and deactivating the touch sensor only after detecting the RFID tag using proximity sensing of the touch sensor;

reading the RFID tag that was detected by the touch sensor by using the activated RFID tag reader; and reactivating the touch sensor and deactivating the RFID tag reader after reading the RFID tag in order to conserve power in the battery powered system by only actively scanning for RFID tags using the touch sensor and not the RFID tag reader.

15. The method as defined in claim 14 wherein the method further comprises activating RFID tag detection and reading circuitry when activating the RFID tag reader.

16. The method as defined in claim 14 wherein the method further comprises providing an electrode grid as a sensor for the touch sensor.

17. The method as defined in claim 16 wherein the method further comprises dynamically configuring the electrode grid so that it may also function as an RFID antenna for the RFID tag reader in order to share the electrode grid.

18. The method as defined in claim 17 wherein the method further comprises forming the electrode grid from a plurality of conductive segments whose connections are controllable in order to create a desired sensor or antenna.

19. The method as defined in claim 18 wherein the method further comprises using a plurality of transistors in order to control connections between the plurality of conductive segments.

20. The method as defined in claim 14 wherein the method further comprises:
1) providing an electrode grid as a sensor for the touch sensor; and
2) providing an RFID antenna for the RFID tag reader, wherein the electrode grid and the RFID antenna are disposed adjacent to each other such that an RFID tag that is detected by the touch sensor is readable by the RFID antenna without having to move the RFID antenna.

* * * * *